(12) United States Patent
Liu (10) Patent No.: US 11,454,341 B2
(45) Date of Patent: Sep. 27, 2022

(54) FASTENING STRUCTURE

(71) Applicant: FUL CHEE ENT CO., LTD., Taichung (TW)

(72) Inventor: Yu-Chen Liu, Taichung (TW)

(73) Assignee: FUL CHEE ENT CO., LTD., Taichung (TW)

( * ) Notice: Subject to any disclaimer, the term of this patent is extended or adjusted under 35 U.S.C. 154(b) by 738 days.

(21) Appl. No.: 16/412,371

(22) Filed: May 14, 2019

(65) Prior Publication Data
US 2020/0292114 A1     Sep. 17, 2020

(51) Int. Cl.
| F16L 37/00 | (2006.01) |
| F16L 37/107 | (2006.01) |
| F16B 1/00 | (2006.01) |
| F16B 21/04 | (2006.01) |

(52) U.S. Cl.
CPC ........... *F16L 37/004* (2013.01); *F16L 37/107* (2013.01); *F16B 21/04* (2013.01); *F16B 2001/0035* (2013.01)

(58) Field of Classification Search
CPC .................. F16B 37/107; F16B 37/004; F16B 2001/0035; F16B 21/04
See application file for complete search history.

(56) References Cited

U.S. PATENT DOCUMENTS

| 4,622,726 A * | 11/1986 | Nakamura ........... | A44C 5/2057 |
| | | | 24/663 |
| 5,367,891 A * | 11/1994 | Furuyama ............ | A44C 5/2057 |
| | | | 63/3 |
| 7,523,527 B2 * | 4/2009 | Garber ................. | A44C 5/2061 |
| | | | 24/587.11 |

* cited by examiner

*Primary Examiner* — Robert Sandy
(74) *Attorney, Agent, or Firm* — Raymond Chan (57) ABSTRACT

A fastening structure includes a circular sleeve and a coupling member. One end of the circular sleeve has a receiving trough. A bottom of the receiving trough is provided with a first magnetic member. A wall of the receiving trough is provided with a protruding post. At least one guide groove is formed on an outer wall of one end of the coupling member. One end of the guide groove is an open axial groove having an opening. Another end of the guide groove is a closed axial groove having a stop end. The guide groove has a transverse groove between the open axial groove and the closed axial groove. Another end of the coupling member is a pivot end that has a central passage extending inwardly. A second magnetic member is disposed in the central passage. The first and second magnetic members have repulsive magnetic poles.

1 Claim, 10 Drawing Sheets

FASTENING STRUCTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a fastening structure, and more particularly to a fastening structure that includes a circular sleeve and a coupling member to be connected firmly by means of the repulsive fore of two magnetic members inside the circular sleeve and the coupling member.

Description of Related Arts

Figure 1:
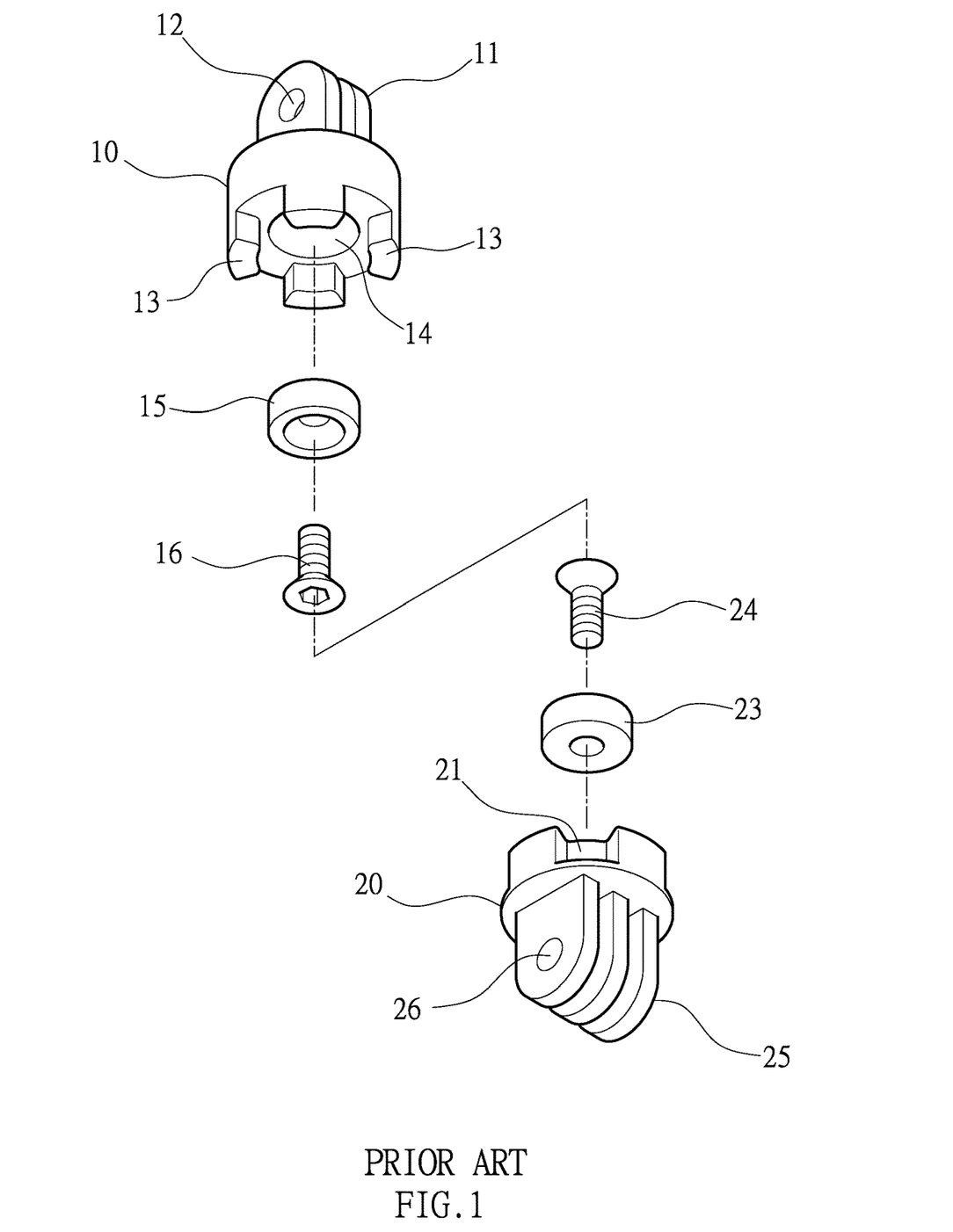
FIG. 1 is an exploded view of a conventional fastener.
Figure 2:
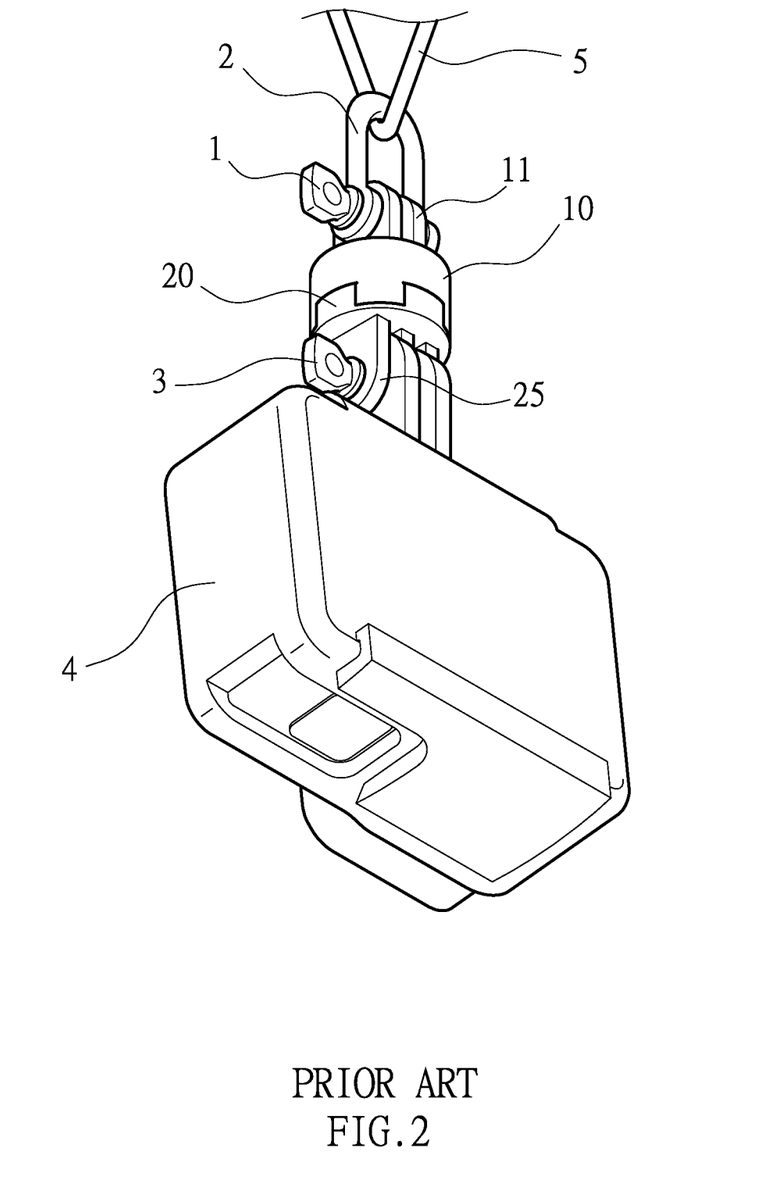
FIG. 2 is a perspective view of the conventional fastener when in use.
Figure 3:
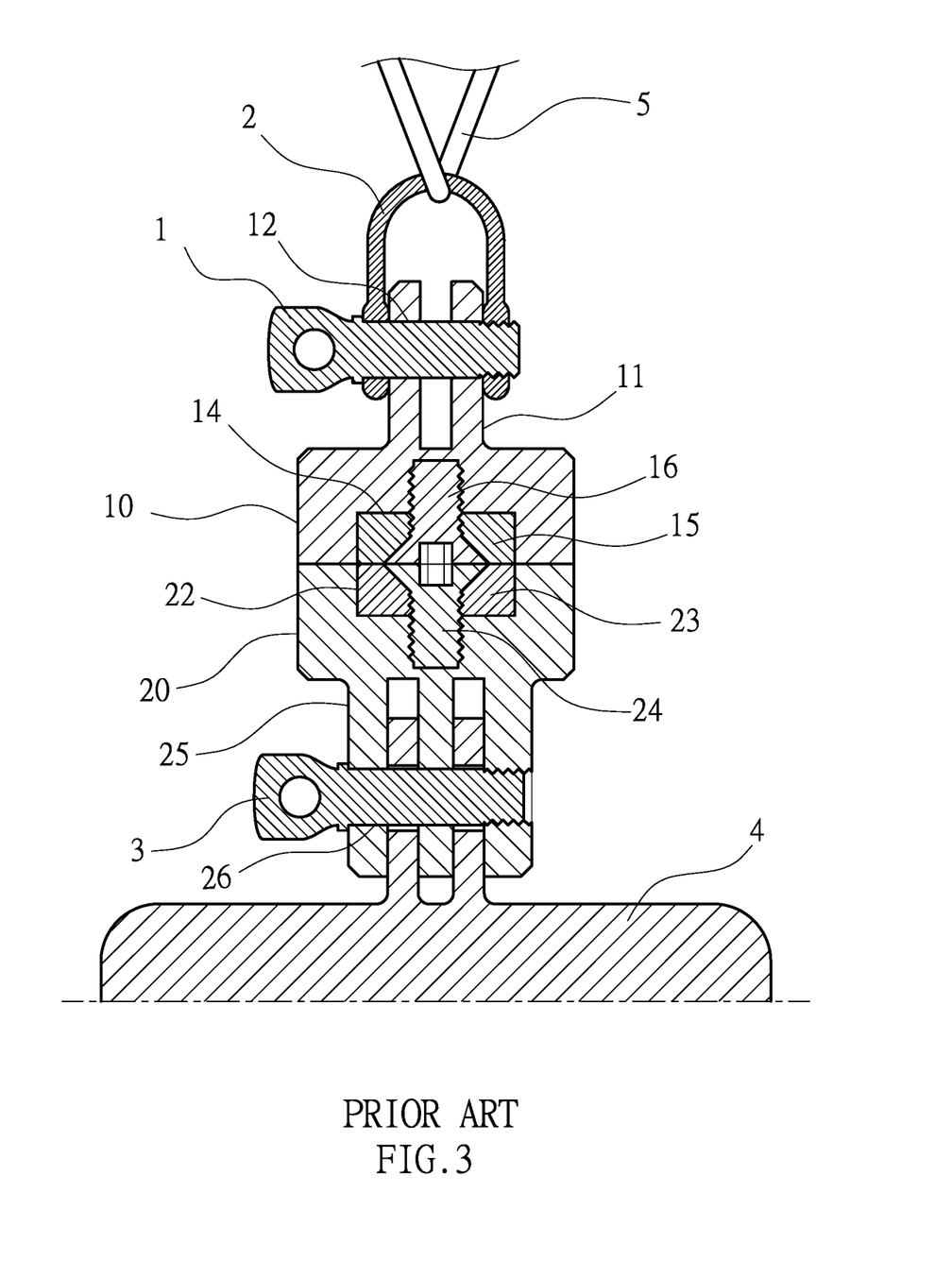
FIG. 3 is a cross-sectional view of the conventional fastener when in use.
Figure 4:
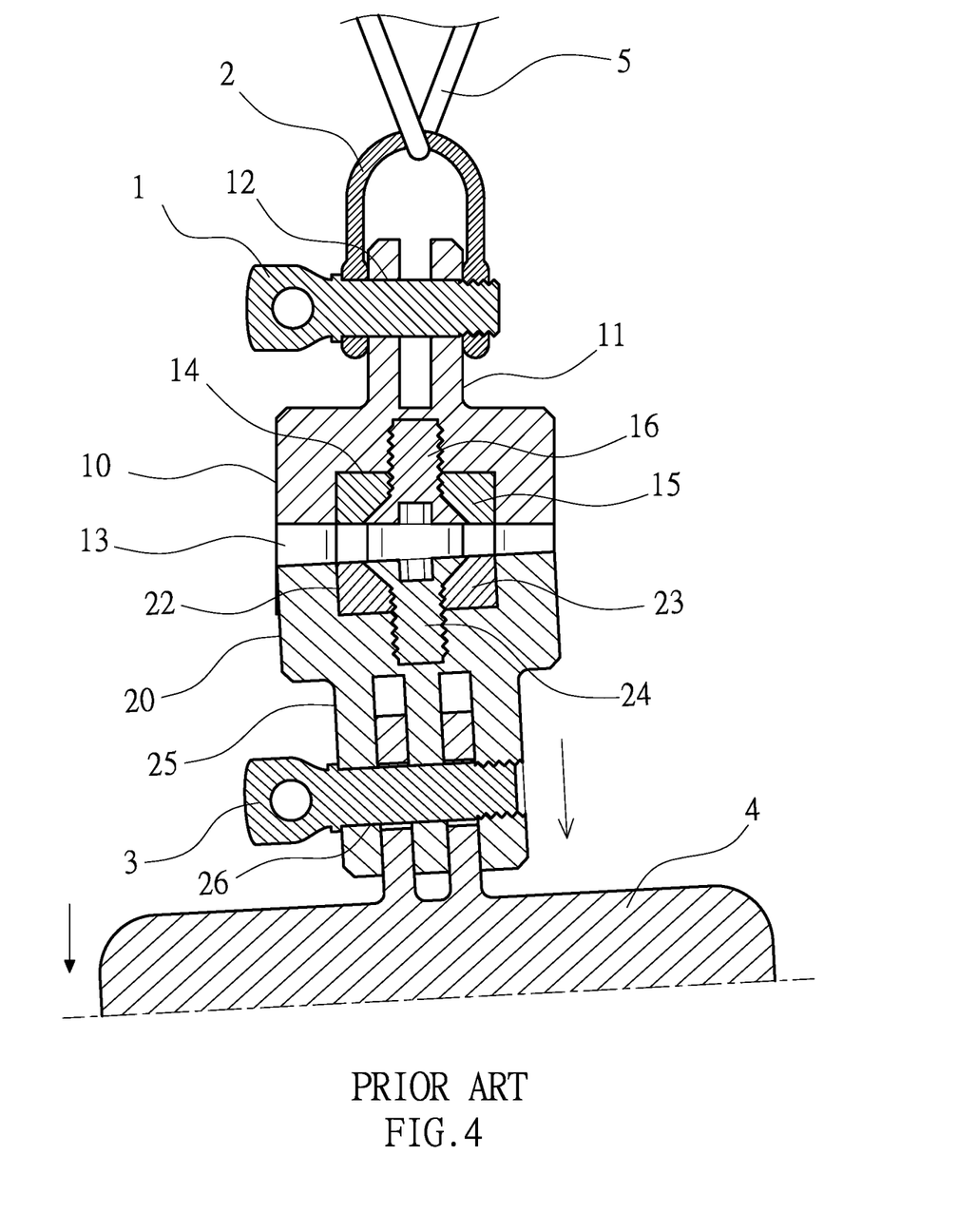
FIG. 4 is a cross-sectional view of the conventional fastener, showing that the heavy object is going to disengage from the second fastening member.
Figure 5:
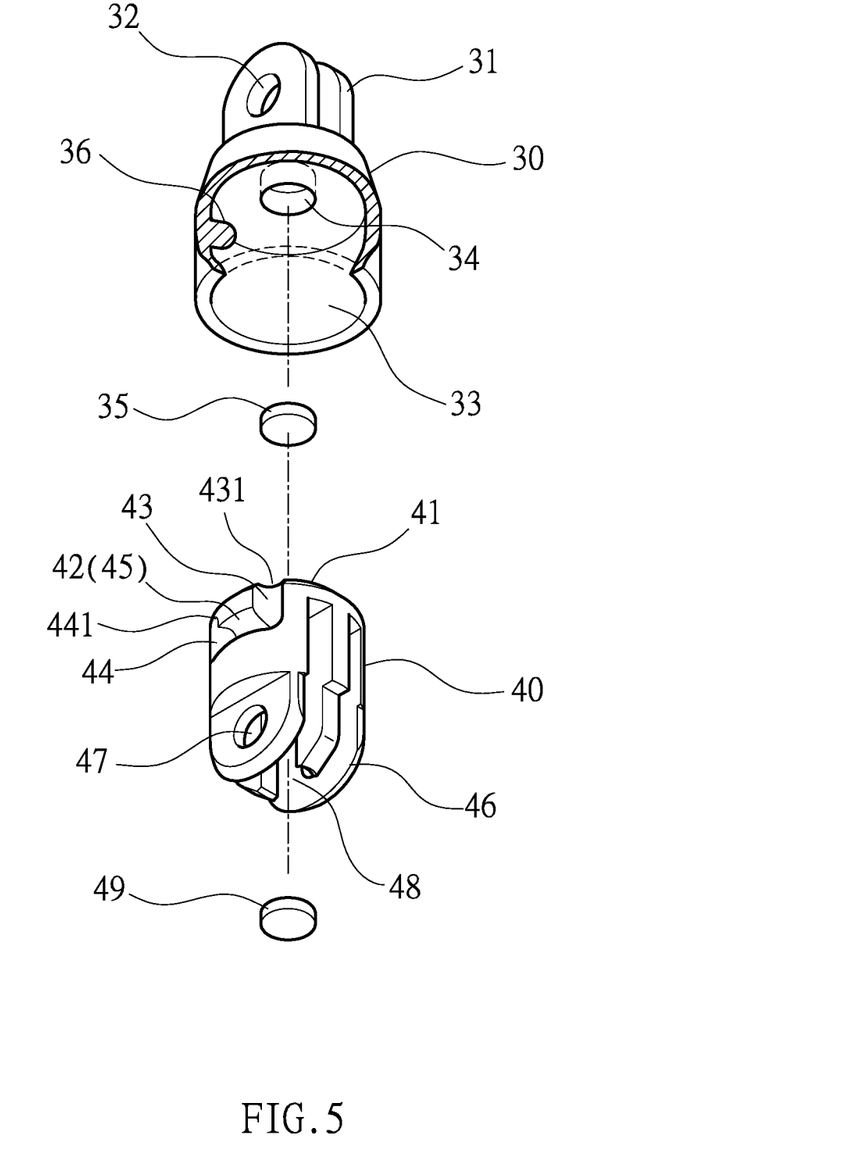
FIG. 5 is an exploded view of the present invention.
Figure 6:
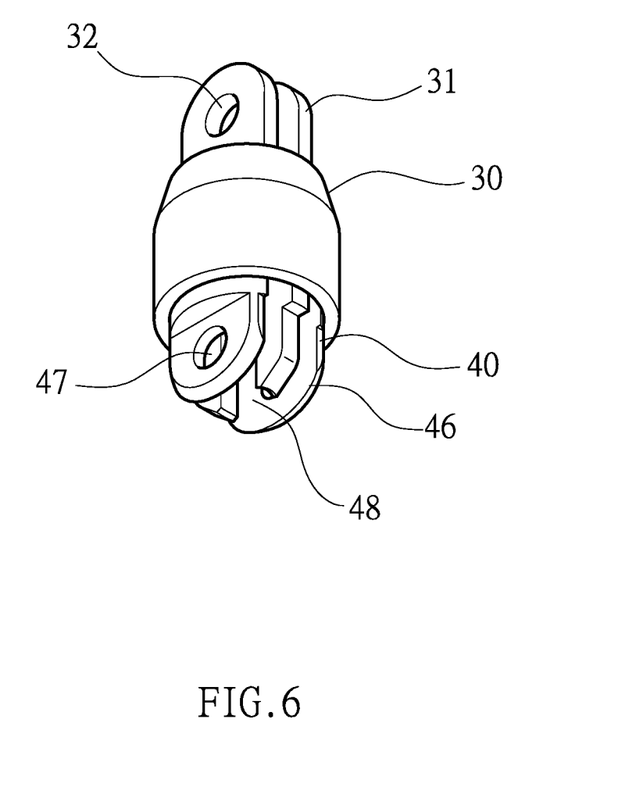
FIG. 6 is a perspective view of the present invention.
Figure 7:
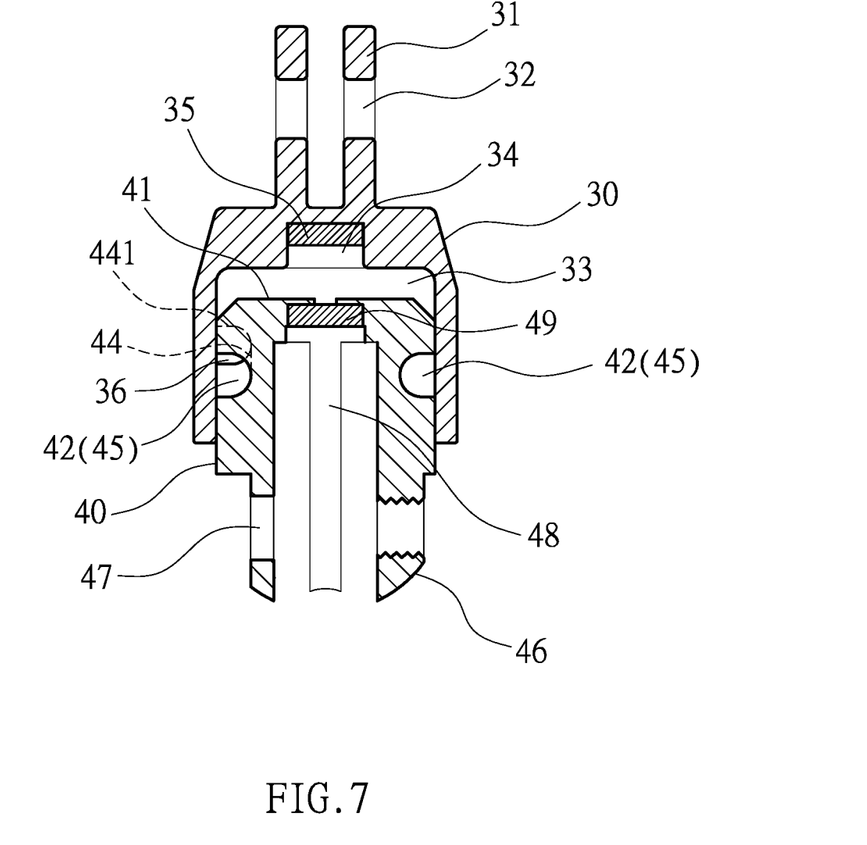
FIG. 7 is a cross-sectional view of the present invention.

A conventional fastener, as shown in FIGS. 1 to 4, comprises a first fastening member 10 and a second fastening member 20. One end of the first fastening member 10 is a connecting end 11 having a connecting hole 12. The other end of the first fastening member 10 is provided with a plurality of engaging posts 13 arranged annularly. The central end face of the other end of the first fastening member 10 is recessed to form a first through 14. The first trough 14 is provided with a magnet 15 that is locked by a bolt 16. One end of the second fastening member 20 has a plurality of engaging grooves 21 arranged annularly and corresponding to the plurality of engaging posts 13. The central end face of the end of the second fastening member 20 is recessed to form a second through 22 corresponding to the first through 14. The second trough 22 is provided with a magnet 23 that is locked by a bolt 24. The other end of the second fastening member 20 is a pivot end 25 having a pivot hole 26. Through the two magnets 15, 23 to attract each other, the engaging posts 13 of the first fastening member 10 are aligned and engaged with the engaging grooves 21 of the second fastening member 20. Through the above fastener, two separate objects can be joined quickly. For example, as shown in FIG. 2 through FIG. 4, the connecting end 11 of the first fastening member 10 is pivotally connected with a ring 2 through a first bolt 1, and the pivot end 25 of the second fastening member 20 is pivotally connected with a heavy object 4 (such as, a box with an action camera) through a second bolt 3. The ring 2 is provided with a rope 5, so that the rope 5 can be hung on the user's neck for walking or exercising. The weight of the heavy object 4 increases the burden that the two magnets 15, 23 attract each other. The first fastening member 10 may disengage from the second fastening member 20 accidentally (as shown in FIG. 4) during the exercise, resulting in that the heavy object 4 fall and the heavy object 4 may be damaged. Accordingly, the inventor of the present invention has devoted himself based on his many years of practical experiences to solve these problems.

SUMMARY OF THE PRESENT INVENTION

The primary object of the present invention is to solve the above problems and to provide a fastening structure. The fastening structure comprises a circular sleeve and a coupling member. A first magnetic member and a protruding post are disposed in the circular sleeve. A second magnetic member and a guide groove are disposed in the coupling member. When the circular sleeve and the coupling member are connected to each other, the protruding post is inserted and positioned in the guide groove through the first magnetic member and the second magnetic member to repel each other, so that two separate objects can be disassembled and assembled easily.

In order to achieve the above object, a fastening structure is provided. The fastening structure comprises a circular sleeve and a coupling member. One end of the circular sleeve is a connecting end. An end face of another end of the circular sleeve is recessed to form a receiving trough. A bottom of the receiving trough is provided with a first magnetic member. A wall of the receiving trough is provided with a protruding post. The coupling member has a cylindrical shape. A second magnetic member corresponding to the first magnetic member is disposed inside one end of the coupling member. The first magnetic member and the second magnetic member have repulsive magnetic poles. At least one guide groove is formed on an outer wall of the coupling member. One end of the guide groove is an open axial groove with an opening at an edge of the coupling member. Another end of the guide groove is a closed axial groove. The closed axial groove has a stop end at its distal end thereof. The guide groove has a transverse groove between the open axial groove and the closed axial groove to communicate with the open axial groove and the closed axial groove. Another end of the coupling member is a pivot end. When the coupling member is to be fitted in the receiving trough, the protruding post enters the guide groove from the opening of the open axial groove and passes through the transverse groove. Through the first magnetic member and the second magnetic member to repel each other, the protruding post is locked to the stop end of the closed axial groove.

In an embodiment of the present invention, the bottom of the receiving trough is further recessed to form a first accommodating hole for accommodating the first magnetic member.

In an embodiment of the present invention, the pivot end of the coupling member is provided with a central passage extending inwardly, and the second magnetic member is disposed at a bottom of the central passage.

In an embodiment of the present invention, the guide groove has a "7"-like shape.

In an embodiment of the present invention, the first magnetic member and the second magnetic member are strong magnets or general magnets.

DETAILED DESCRIPTION OF THE PREFERRED EMBODIMENT

Embodiments of the present invention will now be described, by way of example only, with reference to the accompanying drawings.

Referring to FIG. 5 through FIG. 11, a fastening structure comprises a circular sleeve 30 and a coupling member 40. One end of the circular sleeve 30 is a connecting end 31 having a connecting hole 32. The end face of another end of the circular sleeve 30 is recessed to form a receiving trough 33. The bottom of the receiving trough 33 is further recessed to form a first accommodating hole 34. A first magnetic member 35 is attached to the first accommodating hole 34. The wall of the receiving trough 33 is provided with a protruding post 36. The coupling member 40 has a cylindrical shape. The end face of one end of the coupling member 40 is a flat face 41. At least one "7"-shaped guide groove 42 is formed on the outer wall of the coupling member 40. One end of the guide groove 42 is an open axial groove 43. The open axial groove 43 intersects the flat face 41 and has an opening 431 at the edge of the flat face 41. Another end of the guide groove 42 is a closed axial groove 44. The closed axial groove 44 does not intersect the flat surface 41 and has a stop end 441 at its distal end thereof. The guide groove 42 further has a transverse groove 45 between the open axial groove 43 and the closed axial groove 44 to communicate with the open axial groove 43 and the closed axial groove 44. Another end of the coupling member 40 is a pivot end 46 having a pivot hole 47. The pivot end 46 is provided with a central passage 48 extending inwardly close to the flat face 41 of the coupling member 41. A second magnetic member 49 corresponding to the first magnetic member 35 is attached to the bottom of the central passage 48. The first magnetic member 35 and the second magnetic member 49 have repulsive magnetic poles. When the coupling member 40 is to be fitted in the receiving trough 33 of the circular sleeve 30, the protruding post 36 is inserted into the guide groove 42 from the opening 431 of the open axial groove 43 and passes through the transverse groove 45, and the first magnetic member 35 and the second magnetic member 49 repel each other to lock the protruding post 36 to the stop end 441 of the closed axial groove 44. Through the above fastening structure, two separate objects can be assembled and disassembled conveniently.

Figure 8:
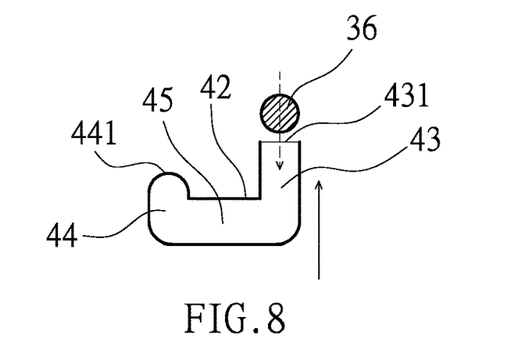
FIG. 8 is a schematic view of the present invention, showing that the protruding post is to be inserted into the guide groove from the opening.
Figure 9:
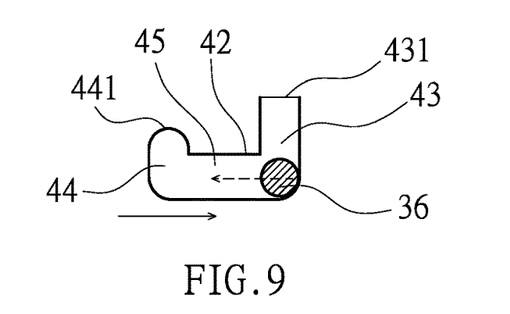
FIG. 9 is a schematic view of the present invention, showing that the protruding post is moved to one end of the transverse groove.
Figure 10:
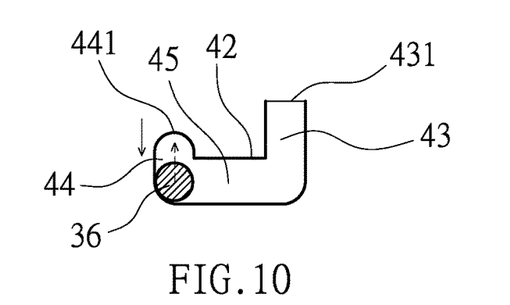
FIG. 10 is a schematic view of the present invention, showing that the protruding post is moved to the other end of the transverse groove.
Figure 11:
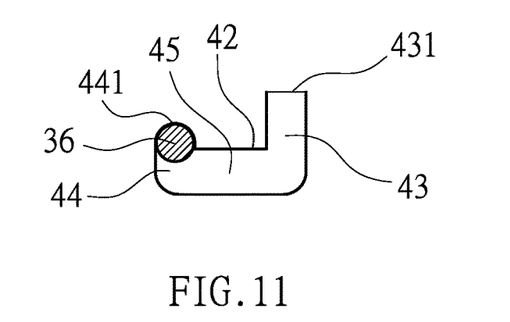
FIG. 11 is a schematic view of the present invention, showing that the protruding post is locked to the stop end.
Figure 12:
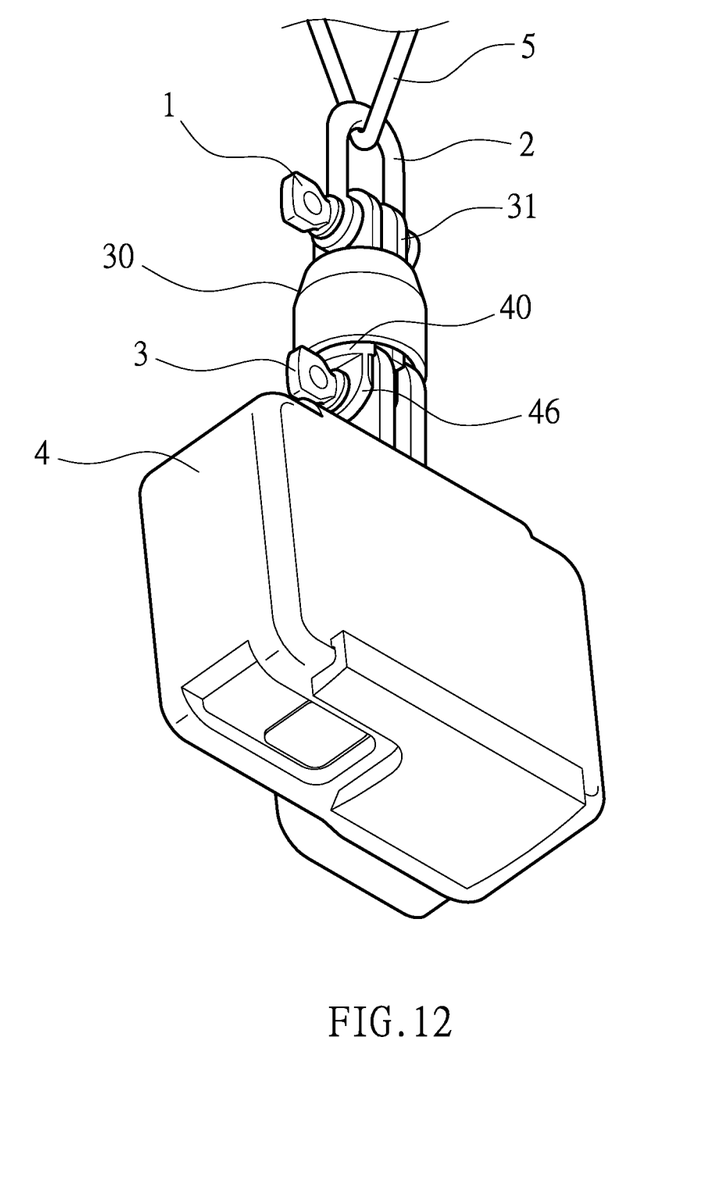
FIG. 12 is a perspective view of the present invention when in use.
Figure 13:
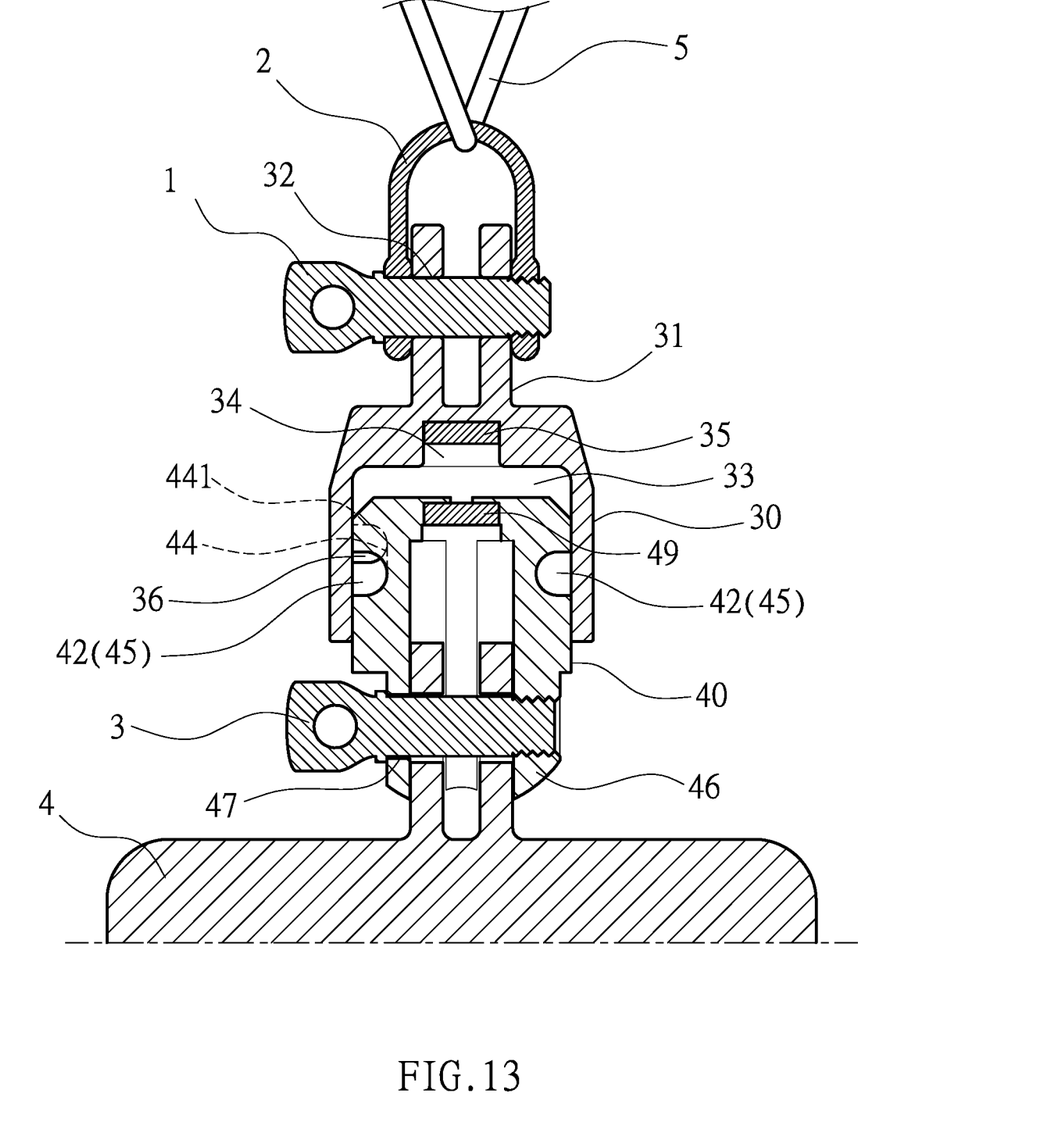
FIG. 13 is a cross-sectional view of the present invention when in use.

The assembly and function of the invention are described below. Please refer to FIGS. 5 to 13. The circular sleeve 30 and the coupling member 40 may be made of a hard plastic or metal material (such as, aluminum alloy). With the harder material, the circular sleeve 30 and the coupling member 40 can sustain the wear and tear caused by frequent assembly and disassembly and have the ability of elastic deformation. The first magnetic member 35 and the second magnetic member 49 may be strong magnets or general magnets, having like poles to repel each other. When the coupling member 40 is to be mounted to the circular sleeve 30, one end of the coupling member 40 is axially inserted into the receiving trough 33 of the circular sleeve 30, and the opening 431 of the guide groove 42 is aligned with the protruding post 36 (as shown in FIG. 8), and a force greater than the repulsive force of the first magnetic member 35 and the second magnetic member 49 is applied to press the circular sleeve 30 and the coupling member 40, allowing the protruding post 36 to enter the open axial groove 43 from the opening 431. When the applied force is to the limit, the protruding post 36 is at one end of the transverse groove 45 (as shown in FIG. 9). At this time, the coupling member 40 is rotated clockwise relative to the circular sleeve 30. After the protruding post 36 is moved along the transverse groove 45 to the other end of the transverse groove 45, the coupling member 40 cannot be further rotated, that is, the protruding post 36 has entered the closed axial groove 44 (as shown in FIG. 10). At this time, the force applied to the circular sleeve 30 and the coupling member 40 is stopped. The repulsive force of the first magnetic member 35 and the second magnetic member 49 is to push the circular sleeve 30 and the coupling member 40 away from each other. The protruding post 36 is moved along the closed axial groove 44 to lean against the stop end 441 (as shown in FIG. 11). By the first magnetic member 35 and the second magnetic member 49, the repulsive force is constantly maintained, so that the circular sleeve 30 and the coupling member 40 are firmly joined together. When in use, as shown in FIG. 12 and FIG. 13, the connecting end 31 of the circular sleeve 30 is pivotally connected with a ring 2 through a first bolt 1, and the pivot end 46 of the coupling member 40 is pivotally connected with a heavy object 4 (such as, a box with an action camera) through a second bolt 3. In this way, although the heavy object 4 has a certain weight, even if the user acts fiercely, the protruding post 36 can be stably abutted against the stop end 441 of the closed axial groove 44, (The direction of the weight of the heavy object 4 forces the protruding post 36 to abut against the stop end 441 more tightly.), so that the heavy object 4 won't fall to be damaged. On the contrary, if the coupling member 40 is to be detached from the circular sleeve 30, it is necessary to apply a force greater than the repulsive force of the first magnetic member 35 and the second magnetic member 49 to press the circular sleeve 30 and the coupling member 40. When the applied force is to the limit, the protruding post 36 is at one end of the transverse groove 45. At this time, the coupling member 40 is rotated counterclockwise relative to the circular sleeve 30. After the protruding post 36 is moved along the transverse groove 45 to the other end of the transverse groove 45, the coupling member 40 cannot be further rotated, that is, the protruding post 36 has entered the open axial groove 43. At this time, the force applied to the circular sleeve 30 and the coupling member 40 is stopped. The repulsive force of the first magnetic member 35 and the second magnetic member 49 is to push the circular sleeve 30 and the coupling member 40 away from each other. The protruding post 36 is moved along the open axial groove 43 and is disengaged from the opening 431, so that the circular sleeve 30 and the coupling member 40 are separated from each other, thereby achieving the effect of convenient disassembly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A fastening structure, comprising a circular sleeve and a coupling member; one end of the circular sleeve being a connecting end, an end face of another end of the circular sleeve being recessed to form a receiving trough, a bottom of the receiving trough being provided with a first magnetic member, a wall of the receiving trough being provided with a protruding post; the coupling member having a cylindrical shape, a second magnetic member corresponding to the first magnetic member being disposed inside one end of the coupling member, the first magnetic member and the second magnetic member having repulsive magnetic poles, at least one guide groove being formed on an outer wall of the coupling member, one end of the guide groove being an open axial groove with an opening at an edge of the coupling member, another end of the guide groove being a closed axial groove, the closed axial groove having a stop end at its distal end thereof, the guide groove having a transverse groove between the open axial groove and the closed axial groove to communicate with the open axial groove and the closed axial groove; another end of the coupling member being a pivot end; wherein when the coupling member is to be fitted in the receiving trough, the protruding post is inserted in the guide groove from the opening of the open axial groove and passes through the transverse groove, through the first magnetic member and the second magnetic member to repel each other, the protruding post is locked to the stop end of the closed axial groove, wherein the pivot end of the coupling member is provided with a central passage extending inwardly, and the second magnetic member is disposed at a bottom of the central passage.

* * * * *